(12) United States Patent
Deivasigamani et al.

(10) Patent No.: US 8,744,439 B2
(45) Date of Patent: Jun. 3, 2014

(54) METHODS AND APPARATUS FOR INTELLIGENT INITIATION OF CONNECTIONS WITHIN A NETWORK

(75) Inventors: Giri Prassad Deivasigamani, Cupertino, CA (US); Gaurav Nukala, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 107 days.

(21) Appl. No.: 13/269,498

(22) Filed: Oct. 7, 2011

(65) Prior Publication Data

US 2013/0090115 A1    Apr. 11, 2013

(51) Int. Cl.
*H04W 48/20* (2009.01)

(52) U.S. Cl.
USPC .......................................... 455/434; 370/311

(58) Field of Classification Search
CPC . H04W 48/18; H04W 52/0229; H04W 52/02; H04W 72/04
USPC .......... 455/434, 574; 370/311, 329, 328, 331, 370/338
See application file for complete search history.

(56) References Cited

U.S. PATENT DOCUMENTS

2008/0075035 A1 * 3/2008 Eichenberger ................ 370/328
2009/0270091 A1 * 10/2009 Joshi et al. .................... 455/434

FOREIGN PATENT DOCUMENTS

WO    WO 2004/043098 A1    5/2004
WO    WO 2008/025003 A2    2/2008
WO    WO 2009/120898 A2    10/2009

* cited by examiner

*Primary Examiner* — Phuoc H Doan
(74) *Attorney, Agent, or Firm* — Womble Carlyle Sandridge & Rice LLP (57) ABSTRACT

Methods and apparatus enabling connection and/or re-connection to an access point of a network based on both reception characteristics and also the access point's likelihood to successfully connect (or re-connect). In one such embodiment, an exemplary Long Term Evolution (LTE) user equipment (UE) stores a "blacklist" of LTE enhanced NodeBs (eNBs) that have previously unexpectedly disconnected the UE. The UE will avoid the blacklisted eNBs and will attempt to connect to other eNBs. By avoiding eNBs which have previously been unable to service the UE and instead focusing on other eNBs that may have lower reception quality but likely better suited to service the UE, the UE can avoid prolonged out-of-service (OOS) periods.

19 Claims, 8 Drawing Sheets

METHODS AND APPARATUS FOR INTELLIGENT INITIATION OF CONNECTIONS WITHIN A NETWORK

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of mobile wireless networks. More particularly, in one exemplary aspect, the present invention is directed to methods and apparatus for initiating or re-initiating a data connection to a base station within advanced cellular networks.

2. Description of Related Technology

Wireless networks such as cellular networks provide network service to mobile devices over a large geographic area via a network of base stations. During normal operation, a mobile device establishes a "connection" to a base station in order to transmit and receive data via the cellular network (e.g., place or receive a voice call, text message, etc.) As the mobile device moves, the mobile device and cellular network perform a variety of mobility management functions to ensure that the mobile device can consistently connect to the optimal base station. For example, during an active connection, the cellular network may initiate a "handover" for active connection from a first base station to a second base station, the latter being more optimized for operation under the then prevailing operational and geographic conditions. Similarly, when a mobile device is "idle" (i.e., registered within a cell, but without active communication) it "camps" on a cell (i.e., monitors the cell of a base station) and may intermittently select a new cell to camp on (also commonly referred to as "cell selection" and "cell re-selection").

Long Term Evolution (LTE) is an emerging cellular network standard designed to, among other things, maximize high-speed data transfer. LTE (and its related progeny LTE-Advanced (LTE-A)) is the latest successor to a cellular technology family that includes Global System for Mobile Communications (GSM), General Packet Radio Service (GPRS), Enhanced Data Rates for GSM Evolution (EDGE), Universal Mobile Telecommunications System (UMTS), High Speed Packet Access (HSPA), etc. LTE is the first of the so-called "fourth generation" (4G) cellular network technologies, which provide an all-Internet Protocol (IP) data delivery paradigm (i.e., 4G technologies are limited to data packet delivery only). Current implementations of LTE do not coordinate base stations; instead, the overall network is a "flattened" IP network (with very minimal hierarchy). The uncoordinated nature of the LTE network infrastructure results in break-before-make type transactions; e.g., LTE handovers are "hard", in that the mobile device breaks its connection with the first base station before restoring the connection with the second base station. Contrast so-called "soft" handovers, wherein the mobile device connects to the second base station before breaking the connection with the first base station.

Current implementations of LTE cellular networks handle cell selection, cell re-selection, and handover on the basis of received signal strength. Received signal strength is a measurement of the signal power as received at the mobile device. Historically, received signal strength was a computationally efficient metric for a mobile device to ascertain the relative quality of signals received from multiple base stations. Traditionally cellular technology has accordingly focused largely on maintaining a connection between the mobile device and the cellular network over a noisy radio channel.

However, unlike other cellular standards, LTE technology is designed to frequently break and re-establish connections with the mobile device. In fact, LTE networks are configured to maximize the overall network performance, irrespective of many other considerations. For example, in some cases, active connections to a mobile device with an LTE network can be abruptly ended so that the base station can provide better service to other devices. Similarly, handovers within LTE may not always be serviced (e.g., where the destination base station is unable to service the handover request due to network congestion, etc.). LTE networks can break a connection to a mobile device, even where the mobile device has good reception (e.g., high received signal strength). Consequently, unlike previous cellular network technologies, reception quality may not accurately reflect the quality of service a mobile device can expect from an LTE base station.

As previously indicated, existing LTE mobile devices attempt to establish or re-establish data connections to the base station having the highest received signal strength. Unfortunately, in many situations where a mobile device is dropped from a base station, the base station from which the mobile device was just disconnected is also the base station that has the highest received signal strength. Consequently, LTE mobile devices will attempt to re-establish a data connection to that same base station; however, in many cases, the base station still cannot support the LTE mobile device for any number of possible reasons. This can result in prolonged out-of-service (OOS) periods, where the LTE mobile device cannot connect back to the same (and ostensibly most optimal) base station.

Accordingly, improved solutions are needed for LTE mobile device cell selection, cell re-selection, and handover, ideally which consider a base station's propensity for servicing a data transfer request successfully, in addition to reception quality. More generally, improved methods and apparatus are needed for initiating or re-initiating a data connection to a base station within advanced cellular networks.

SUMMARY OF THE INVENTION

The present invention satisfies the aforementioned needs by providing improved apparatus and methods for initiating or re-initiating a data connection to a base station within advanced cellular networks.

In a first aspect of the present invention, a client device for connection to a network is disclosed. In one embodiment, the client device comprises: a wireless interface; a processor; and a storage device in data communication with the processor, the storage device including computer-executable instructions that are configured to, when executed by the processor: maintain a list of radio access points (e.g., base stations or access points), the list including one or more parameters useful for identifying an access point having a likelihood of servicing a connection request successfully; identify a first access point based on the one or more parameters; and, establish a connection to the first access point.

In one exemplary variant, the client device includes a Long Term Evolution (LTE) user equipment (UE), the list of access points includes a blacklist of enhanced NodeB (eNB) that have unexpectedly disconnected the UE, and the identification of the first access point is based at least in part on the first access point not being on the blacklist and having a desirable received signal strength.

In another variant, the list of access points includes a blacklist of access points that are unavailable for connection.

In yet another variant, the list of access points includes a whitelist of access points that are preferred for connection.

In still another variant, the one or more parameters include historical data.

In some implementations, the one or more parameters expire according to a timer. At least one of the parameters may also include e.g., an access point capability.

In another embodiment, the client device includes: a wireless interface; a processor; and a storage device in data communication with the processor, the storage device comprising computer-executable instructions. The instructions are configured to, when executed by the processor: at least periodically obtain a list of access points within the network maintained by a network entity using the wireless interface, the list comprising one or more parameters useful for identifying an access point having a likelihood of servicing a connection request successfully; when the wireless interface experiences a loss of connection, identify a first access point from the last obtained list, based on the one or more parameters; and establish a new connection to the first access point.

In a second aspect of the present invention, a method for connecting to an access point of a network is disclosed. In one exemplary embodiment, the method includes: maintaining a list of access points, the list comprising one or more access points which are identified as being unsuitable for connection; searching for available access points; determining a first access point from the searched available access points, where the first access point is not on the list of access points; and establishing a connection to the determined first access point. In one variant, the client device comprises a Long Term Evolution (LTE) user equipment (UE), and the access point comprises an enhanced NodeB (eNB).

In another embodiment, the method includes: identifying a plurality of available access points; accessing a list of access points, the list comprising information relating to one or more parameters for each of the listed access points, the information useful for determining an access point having a suitable likelihood of servicing a connection request successfully; determining a first access point from the list based at least in part on the one or more parameters and the identified plurality of available access points; requesting connection to the determined first access point; and responsive to a granted request, establishing connection to the determined first access point.

In a third aspect of the invention, a method of maintaining suitable connection latency within a wireless network is disclosed. In one embodiment, the method includes: identifying a need to form a connection between a mobile device and an access point of the network; evaluating at least one metric relating to historical connection interruption by a first access point of the network; and based at least in part on the evaluation, selecting a second access point over the first access point for forming the connection, the second access point having a less desirable air interface quality than the first access point, yet a better historical interruption metric than the first access point.

In a fourth aspect of the invention, a method of maintaining suitable connection performance in a Long Term Evolution (LTE) wireless network is disclosed. In one embodiment, the method includes: selectively avoiding for at least a period of time connection with one or more base stations of the network which have a history of poor call connection service; and selectively utilizing one or more base stations with no history of poor call connection service, irrespective of the signal quality associated with the one or more base stations having the poor history. The selective avoidance and utilization cooperate to avoid undesirable effects on connection performance.

In a fifth aspect of the invention, a computer readable apparatus is disclosed. In one embodiment, the apparatus comprises a storage medium storing at least one computer program, the program including instructions which, when executed on a processing device of a client apparatus, implement access point (e.g., bases station) identification and selection logic for forming a wireless connection.

In a sixth aspect of the invention, a method for selecting an access point for connection to by a mobile device is disclosed.

In a seventh aspect of the invention, a method for evaluating and ranking a plurality of access points of a wireless network for connection to by a mobile device is disclosed.

In an eighth aspect of the invention, a method for enhancing mobile device data throughput via intelligent connection establishment and maintenance is disclosed.

Other features and advantages of the present invention will immediately be recognized by persons of ordinary skill in the art with reference to the attached drawings and detailed description of exemplary embodiments as given below.

All Figures © Copyright 2011 Apple Inc. All rights reserved.

DETAILED DESCRIPTION OF THE INVENTION

Reference is now made to the drawings, wherein like numerals refer to like parts throughout.

Overview

In one aspect of the present invention, a client device performs an evaluation to identify a desirable access point for connection and/or re-connection. The evaluation is in one embodiment performed in terms of both (i) reception characteristics, and (ii) historical propensity for servicing a data transfer request successfully. In one implementation, an exemplary Long Term Evolution (LTE) user equipment (UE)

stores a "blacklist" of LTE enhanced NodeBs (eNBs). The blacklist is populated with eNBs that have previously unexpectedly disconnected the UE. The UE will avoid the blacklisted eNBs, and will attempt to connect to other eNBs. By avoiding eNBs which have previously been unable to service the UE, and instead focusing on other eNBs that may have lower reception quality (but are likely better suited to service the UE), the UE can avoid prolonged out-of-service (OOS) periods.

In one alternate embodiment, a client device stores a "whitelist", where the whitelist identifies access points which are temporarily and/or permanently preferred for use. In yet other embodiments, a client device stores a number of entries, each of the entries identifying an access point (e.g. base station) and one or more fields that can be used to rank the base station's according to a likelihood of servicing a data transfer request successfully. A wide range of various fields which encompass both base station characteristics, reception characteristics and other miscellany (e.g., user requirements, base station requirements, cost considerations, etc.) may be used consistent with the invention.

DETAILED DESCRIPTION OF EXEMPLARY EMBODIMENTS

Exemplary embodiments of the present invention are now described in detail. While these embodiments are primarily discussed in the context of cellular data networks, the general principles and advantages of the invention may be extended to other types of networks and architectures, whether broadband, narrowband, wired or wireless, or otherwise, the following therefore being merely exemplary in nature.

For example, those of ordinary skill in the related arts will recognize that various aspects of the present invention are widely applicable to other wireless networks, including without limitation "Wi-Fi" (e.g., any of the variants of IEEE-Std. 802.11) and "WiMax" (e.g., any of the variants of IEEE-Std. 802.16), as well as other types of cellular networks.

Methods—

Figure 1:
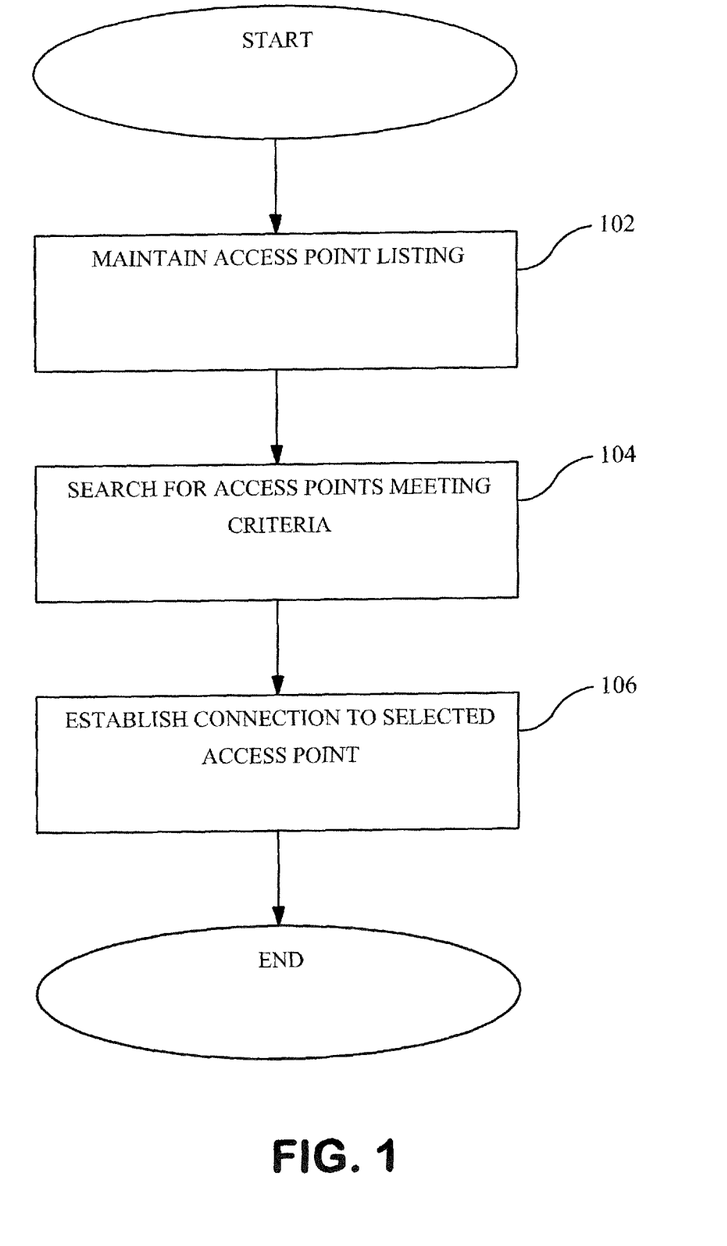
FIG. 1 is a logical flow diagram illustrating one embodiment of a generalized method for initiating or re-initiating a data connection from a client device to one of a population of access points in accordance with the invention.

FIG. 1 illustrates one generalized method for initiating or re-initiating a data connection to a client device to one of a population of access points. As used herein, the term "access point" is intended to broadly encompass, without limitation, any sort of apparatus providing data or signal connectivity for a user device. For instance, a radio base station in a cellular network is one type of access point, while a Wi-Fi AP (Access Point) in a WLAN is another. An infrared (IR) receiver is yet another type of access point, and a microwave/millimeter wave receiver (e.g., dish) another.

Also, as used herein, the term "client device" or "user device" refers generally and without limitation to any sort of electronic device which can communicate directly or indirectly with one or more access points. For instance, a mobile smartphone may communicate via a cellular interface (air interface) with a base station. The same smartphone might also use its WLAN interface to communicate with a Wi-Fi AP.

At step 102 of the method of FIG. 1, a client device maintains a listing of access points. In one exemplary embodiment, the client device is an LTE handset or smartphone, and the access point is an LTE base station, and the listing is stored as an internal database of the LTE handset (e.g., in the memory of the device). In other embodiments, the client device uses the wireless network (e.g., a server or other device thereon) to maintain these aforementioned listing, which it can access upon demand, for example periodically or immediately before a connection is broken. As yet another alternative, the listing may be maintained by a third entity, and the client device may use a different interface thereto (e.g., a WLAN interface) to obtain the listing information for subsequent processing relating to the cellular interface (e.g., LTE) as described below.

In the present context of an LTE network, the client device is capable of connecting to multiple access points, where the access points may disconnect the client device for reasons unrelated to reception quality.

In some embodiments, the access point and client device are further limited to packet-switched operation. Packet switched networks split data into "packets" which are transmitted over a network, typically on a best-effort basis (i.e., packets may be dropped, or arrive out of order, etc.). In contrast, circuit-switched networks set up a fixed connection or circuit between the source and destination which is "live" for the life of the transaction. While various embodiments of the present invention are discussed with respect to packets and packet-switched networks, it is further appreciated that circuit-switched networks may find analogous use for various aspects of the present invention, especially in configurations where circuit-switched networks may break an ongoing connection for reasons unrelated to reception (e.g., to re-allocate resources to a higher priority circuit, etc.).

In one embodiment, the listing may include "blacklisted" (unavailable access points). For example, in one exemplary embodiment, a mobile device stores a listing of base stations that have recently or historically disconnected the mobile device during operation. Since the blacklist keeps track of base stations that were not able to offer suitable service at some point in the past, the mobile device can concentrate instead on base stations which may (or may not) have lower reception quality, but have a higher propensity for providing suitable service.

Alternately, the listing may include "whitelisted" (available access points). Consider, for instance, a mobile device that is connected to a first base station (which did not disconnect it), and voluntarily performs a handover to a second base station, and as a backup measure adds the first base station onto the whitelist. If the mobile device is subsequently disconnected from the second base station, the mobile device can re-attach to the original first base station.

In still other embodiments, the listing may include a weighting of one or more factors associated with base stations. For example, a mobile device may include a listing of base station entries, where each base station entry includes multiple fields related to the associated base station capabilities such as: (i) number of mobile originated disconnects, (ii) number of base station originated disconnects, (iii) supported modulation, coding, and bandwidth capabilities, (iv) average service quality, (v) peak data rate, (vi) average data rate, (vii) peak error rate, (viii) average error rate, (ix) peak latency, (x) average latency, (xi) preferential treatment (e.g., where the mobile device is part of a preferred group e.g., closed service groups (CSGs)), (xii) infrastructure vendor (e.g., where a particular infrastructure vendor may be preferred for service or cost reasons, etc.), (xiii) device type (e.g., macrocell, macrocell, femtocell, picocell, etc.), etc. In some variants, the weighting algorithm may also or alternatively consider physical parameters such as (but not limited to): received signal strength indication (RSSI), signal to noise ratio (SNR), time of flight (e.g., total distance), geographic constraints, etc. In still other variants, the weighting algorithm may further consider cost and user experience considerations, such as for example, user preferences, business considerations, etc. Operational mode may also be considered, such as for example where the mobile device has both a "personal" mode and "business" mode, and the weightings, parameters considered, security, QoS, costs, etc. are different between the two, and hence base station selection may be different depending on whether the call being made is a personal call or business call. It may be for instance that "business" calls require selection of base stations with better quality, better QoS, better security, but are less concerned with cost.

It will also be appreciated that the history or temporal proximity of certain types of events or parameters may be considered. For example, a given base station may have a comparatively high number of base station initiated disconnects; however, the great majority of these may have occurred in the distant past (i.e., not "recently", the definition of which may be prescribed by the client device manufacturer, user, or even network operator), so that certain base stations are not prejudiced indefinitely. Accordingly, in one variant, an X-day moving window or average can be used within a weighting algorithm, such that more recent history of performance is weighted much more heavily as part of the evaluation process.

In one such embodiment, the mobile device additionally updates the listing according to one or more timers. In one such embodiment, each entry in the listing is associated with a corresponding timer, where when the corresponding timer expires, the entry is updated. In one such variant, the entry is deleted from the listing upon timer expiration. In alternate variants, the entry may have a weighting adjusted up or down and the timer reset. In still other embodiments, the entry is updated with new information (e.g., based on monitored data) at timer expiration, and the timer is reset.

In weighted operation, one or more of the fields is associated with a value or a weighting function. The mobile device in one implementation ranks the available base stations in order of most preferred to least preferred on the basis of the total weighted value of the base station. The mobile device accordingly first attempts connection to the most preferred base station, then the next most preferred, etc. If a base station disconnects the mobile device, the mobile device will adjust the associated base station entry accordingly, and will not attempt to re-connect to that base station unless there are no better options.

In other embodiments, the entries in the listing are updated according to an update message. For example, in one such variant, the client device may periodically receive a broadcasted control message, where the broadcasted control message includes status on the nearby access points. In yet other embodiments, the listing may be updated as a function of the device's internal bookkeeping. Common implementations of internal bookkeeping mechanisms include, for example: (i) scheduled periodic updating of entries, (ii) triggered updating of entries determined by an application or event, (iii) triggered updating of entries determined by a user or user configuration, etc.

At step 104 of the method of FIG. 1, the client device searches for one or more access point devices, based on the maintained listing. In exemplary embodiments, a mobile device searches for and/or monitors all base stations, and narrows base station selection to only a subset of the base stations based on the maintained listing. For example, in some embodiments, a handset may only consider base stations that have not been blacklisted, or alternately are on the whitelist for subsequent connection (e.g., per step 106). Combinations of blacklist and whitelist logic are also envisaged, such as where blacklisted base stations are used in effect as a last resort (e.g., best to worst rank), whitelisted base stations are used first (e.g., best to worst rank), and base stations on neither list (aka "greylist" stations) are evaluated according to weighting or some other criteria; e.g., on the fly based on number historical disconnects, RSSI, etc., and used after the whitelist possibilities have been exhausted, but before the blacklist stations are tried. Myriad other permutations or logical constructs will be recognized by those of ordinary skill when given this disclosure.

In a similar vein, embodiments which perform a weighted analysis based on multiple factors may search for and/or monitor all base stations and collect the data for subsequent processing.

In some alternate embodiments, the client device may be able to search for and/or monitor only a subset of the base stations at the outset. For example, some wireless technologies broadcast identification openly, in such wireless networks, the mobile device may exclude blacklisted networks and focus only on the networks of interest.

As a brief aside, during LTE cell search operation, the LTE handset searches for primary synchronization symbols (PSSs) which enable the handset to acquire the slot boundary timing. Once the LTE handset has acquired slot boundary timing, the handset searches for secondary synchronization symbols (SSSS) which provide radio frame timing and cell group identity. Once the handset has radio frame timing, the handset can decode cell control channels, and determine for example the cellular network service provider (Public Land Mobile Network (PLMN)) from system information blocks (SIBs) and master information blocks (MIBs). Within LTE networks, the handset determines the identity of the base station after the handset has decoded broadcast control information (e.g., SIBs).

Within such LTE networks, exemplary embodiments of the present invention are configured for searching and monitoring all nearby base stations, and subsequently basing cell connection decisions on a locally or remotely stored blacklist (or whitelist, weighted listing, etc.). Specifically, because LTE base station identification is stored within SIB control blocks that must be decoded anyway, LTE handsets have to completely decode all nearby base station SIBs before using the internally stored blacklist/whitelist.

It is appreciated however, that the aforementioned constraints are LTE technology limitations, and other technologies may not require searching all base stations. For example, in embodiments where the access point broadcasts its identification openly, the client device may selectively calculate the received signal strength (e.g., RSSI) of any surrounding base stations that are not blacklisted, or alternately the handset can search for one or more preferred base stations identified from a whitelist.

In exemplary embodiments of the present invention, step 104 of the method of FIG. 1 is responsively triggered when a mobile device is disconnected from the base station. For example, in one such example, the base station experiences momentary or semi-permanent network congestion, and is unable to continue to operate at its current capacity. Responsive thereto, it disconnects from the mobile device.

In another such example, a first base station initiates a handover procedure for a mobile device, and attempts to transfer the mobile device to a second base station. During the transfer, the second base station is unable to service the mobile device within a reasonable period of time, and releases the mobile device.

Yet other examples of unexpected connection termination include (but are not limited to) situations such as: failure to respond according to a transaction protocol, failure to periodically initiate communication, unacceptable network performance, unacceptable device performance, aberrant behavior, loss of QoS (Quality of Service), loss of security, etc.

In alternate embodiments, step 104 is initiated when a mobile device attempts to connect or re-connect to a base station. For example, in one such example, a mobile device may be operating in an "idle" mode, and responsive to a user initiated data transfer, the mobile device searches the nearby base stations for connection, based on its listing.

In still other examples, a mobile device may receive a "page" from the network, and search the nearby base stations to receive the paging message.

In yet other embodiments, the mobile device may have an unexpected connection termination and rather than attempt to immediate re-connect to the same base station (or where attempts to re-connect to the same base station have failed), the handset may search for a new base station.

At the conclusion of step 104, the client device has selected at least one access point based on the maintained listing. Thus at step 106, the client device establishes a connection to the selected access point. In one exemplary embodiment, the client device directly attempts to connect to the selected access point. For example, once a handset has determined the optimal base station using both physical constraints (e.g., received signal strength) and internally maintained listings (e.g., a blacklist), the handset initiates a connection to a selected base station.

In other embodiments, the client device requests connection to the selected access point. In one exemplary embodiment, an LTE handset device reports the received signal strength for the selected LTE base station (as opposed to the base station with the highest received signal strength which may be undesirable). Responsively, the selected LTE base station should accept or initiate the connection to the LTE handset; however, in some circumstances, the core network may opt to override the LTE handset requested base station, such as based on network-wide load balancing or congestion considerations, planned maintenance or component failure, etc.

Figure 1A:
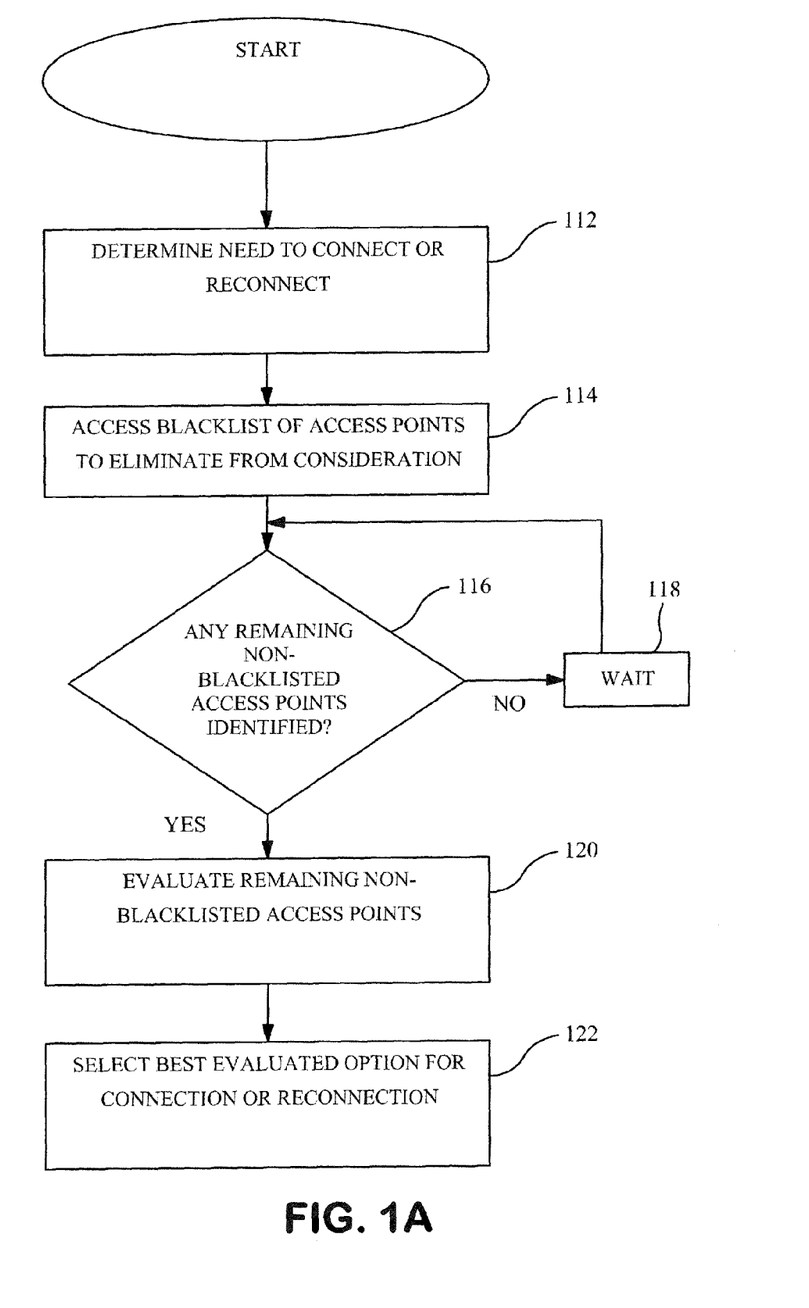
FIG. 1A is a logical flow diagram illustrating a first exemplary implementation of the method of FIG. 1.
Figure 1B:
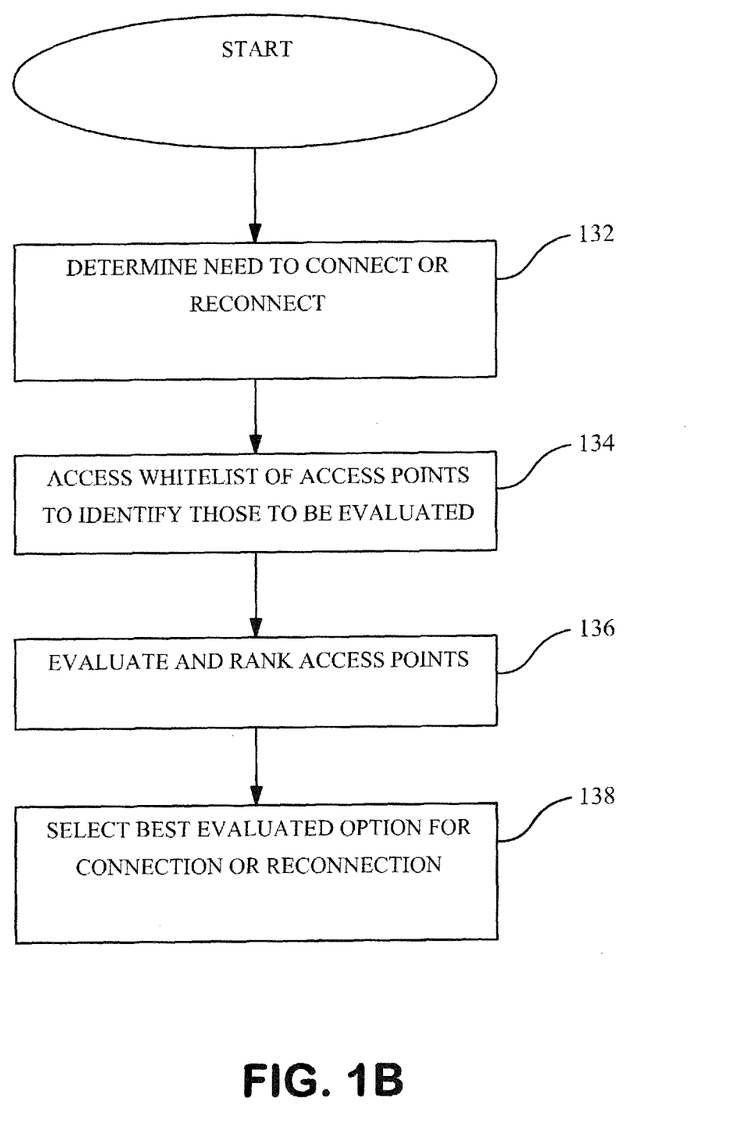
FIG. 1B is a logical flow diagram illustrating a second exemplary implementation of the method of FIG. 1.
Figure 1C:
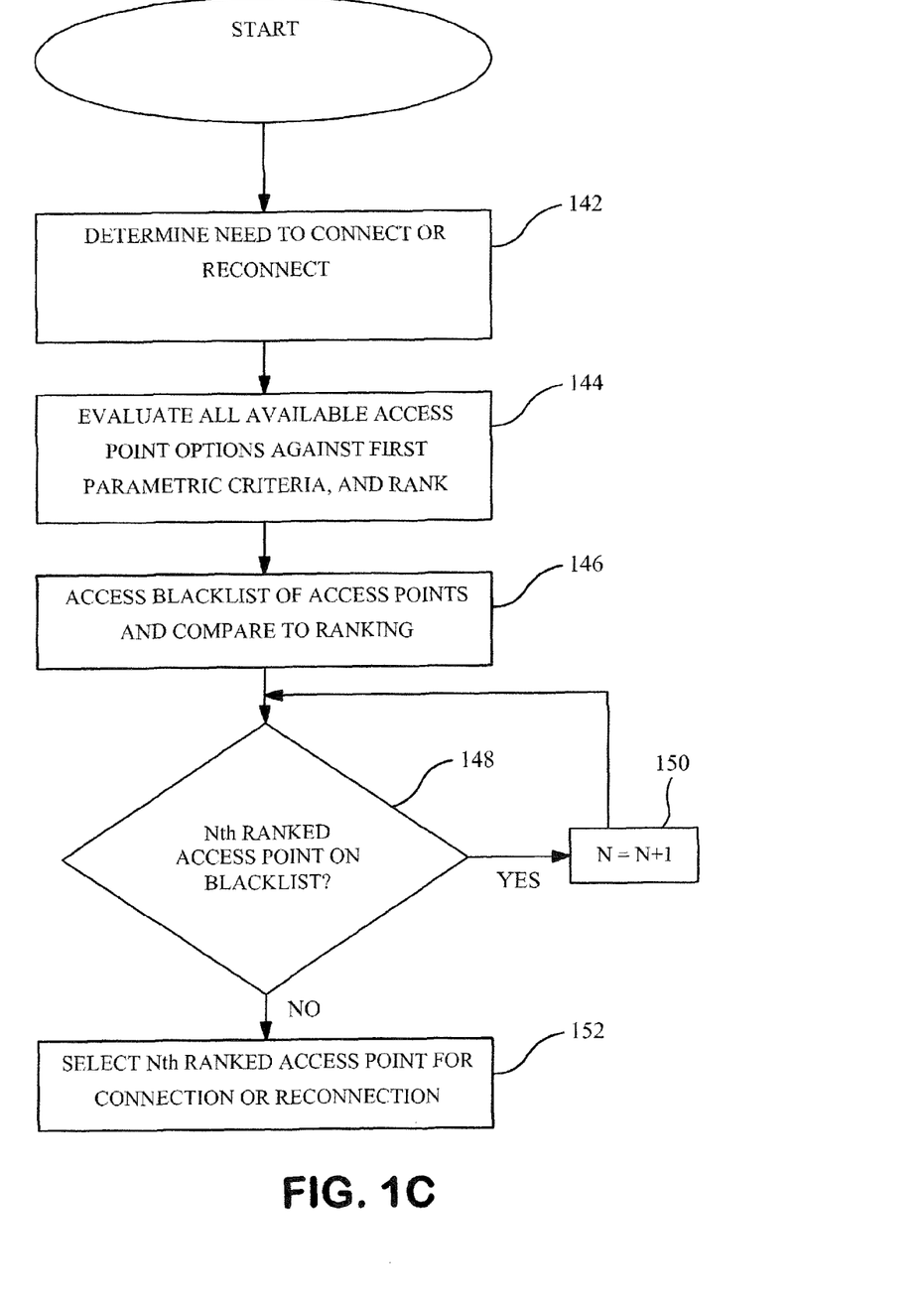
FIG. 1C is a logical flow diagram illustrating a third exemplary implementation of the method of FIG. 1.

FIGS. 1A-1C herein depict various logical flows illustrating exemplary implementations of the foregoing method of FIG. 1.

Referring now to FIG. 1A, a first exemplary implementation of the method of FIG. 1 is illustrated. At step 112 of the method of FIG. 1A, the client device deter mines whether there is a need to connect or reconnect to an access point. If the client device determines that the aforementioned need exists, the device proceeds to step 114.

At step 114, the client device accesses the blacklist of access points. The client device in this embodiment uses the accessed blacklist to eliminate access points from consideration as possible sources to which to connect or reconnect.

At step 116, the client device identifies available access points to which the client device may potentially connect, such as via procedures described elsewhere herein. The client device proceeds to compare the identified available access points to the access points indicated on the blacklist. After the comparison, if no remaining non-blacklisted access points are identified, the client device will wait per step 118. During step 118, the client device, in one variant, may wait a predetermined amount before proceeding back to step 116. In an alternate variant, the client device may continually monitor for the presence of previously unidentified access point. Upon detecting a previously unidentified access point, the client device will proceed back to step 116.

If, at step 116, any remaining non-blacklisted access points are identified, the client device proceeds to step 120. At step 120, the client device evaluates the identified non-blacklisted access points using one or more factors, for example signal strength, supported modulation, etc.

At step 122, the client device selects an evaluated option (e.g., the best or highest scoring option) of the non-blacklisted access points to be used for connection or reconnection.

In an alternate implementation, the client device will select the first non-blacklisted access point that was previously unidentified, irrespective of subsequent unidentified access point of which it may become aware.

Referring now to FIG. 1B, a second exemplary implementation of FIG. 1 is illustrated. At step 132, the client device determines if there is a need to connect or reconnect with an access point. If a need is determined, the client device will proceed to step 134.

At step 134, the client device accesses a whitelist stored thereon of access points deemed available for potential use (or, alternatively, which are affirmatively preferred for selection). In addition, the client device will identify the access points currently available to the client, and then compare the available access points against the access points appearing on the whitelist.

Proceeding to step 136, the client device will evaluate the access points appear both on the whitelist and as available to the client device according to a specified methodology such as those described elsewhere herein. For instance, the evaluated access points will be ranked from best to worst based on the specified methodology.

At step 138, the client device will select an evaluated option (e.g., the best according to rank) for connection or reconnection.

FIG. 1C illustrates a third exemplary implementation of the method of FIG. 1. At step 142, the client device determines if there is a need to connect or reconnect to an access point. If the aforementioned need exists, the device will proceed to step 144.

At step 144, the client device evaluates all available access point options currently available against first parametric criteria (e.g., RSSI, modulation compatibility, capabilities, etc.), and weights and ranks the access points accordingly from best to worst.

At step 146, the client device accesses a blacklist of access points stored thereon and uses the blacklist to compare against the ranked access points. The client device begins by comparing the Nth ranked access point, where N originally is the highest ranked access point. If the N access point appears on the blacklist, the client device proceeds to step 150 to compare the Nth+1 access point, e.g. the next highest ranked access point, to the blacklist. Step 150 repeats until the Nth ranked access point does not appear on the blacklist, thereby proceeding to step 152.

At step 152, the client device selects the highest Nth access point not on the blacklist to be used for connection or reconnection.

Example Operation—

One exemplary method for initiating or re-initiating a data connection in the context of a Long Term Evolution (LTE) base station (also commonly referred to as an "enhanced NodeB" (eNB)) is now described in greater detail. As previously described, the exemplary LTE mobile device (also commonly referred to as user equipment (UE)) according to the invention consults and maintains a listing of "blacklisted" eNBs that are unsuitable for connection (rather than basing eNB selection solely on received signal strength). As described, the blacklist is populated with e.g., historical data, eNB capabilities, etc. In one embodiment, each blacklisted eNB stays on the blacklist for a blackout period; after the blackout period has expired, the eNB is no longer blacklisted and can be re-tried. The blackout period may be set for a fixed interval, or alternately, can be dynamically set on a case-to-case basis.

Figure 2:
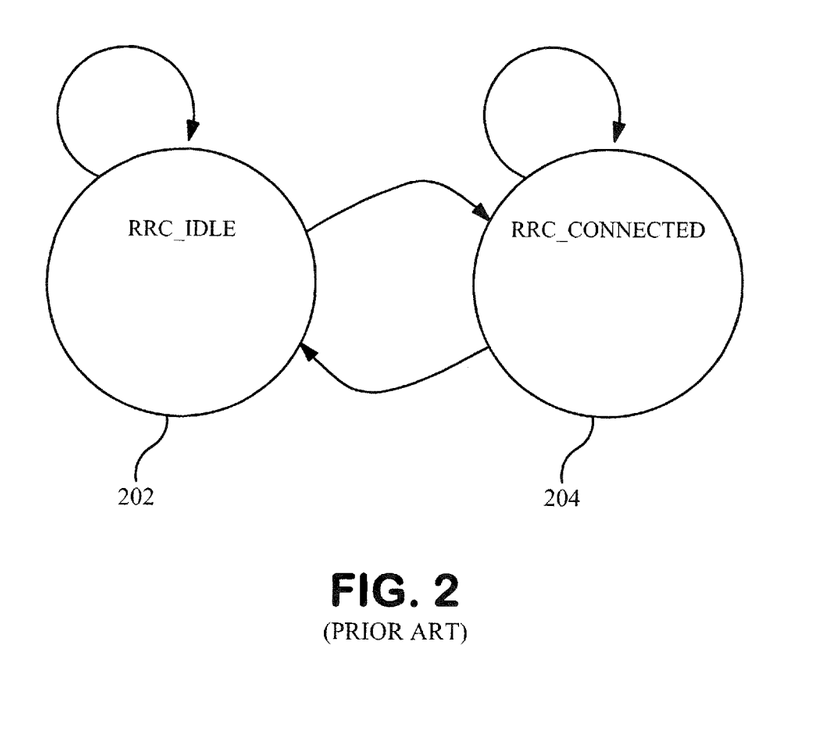
FIG. 2 is a graphical representation of an exemplary prior art state machine (i.e., according to the Long Term Evolution (LTE) Radio Resource Control (RRC) protocol).

FIG. 2 illustrates an exemplary state machine representation of the Long Term Evolution (LTE) Radio Resource Control (RRC) protocol. Each UE has two RRC states: RRC_IDLE 202, and RRC_CONNECTED 204. In the RRC_IDLE state, the UE does not have a signaling radio bearer connection with the eNB. Within the RRC_IDLE state, the UE can inter alia: (i) receive broadcast or multicast data, (ii) operate in discontinuous reception modes (DRX), (iii) monitor control channels, perform neighbor cell measurements, acquire system information, and other miscellany. In the RRC_CONNECTED state, the UE has and maintains a signaling radio bearer connection with the eNB. Within the RRC_CONNECTED state, the UE can inter alia: (i) receive and transmit data (unicast, multicast, broadcast), (ii) operate in both discontinuous reception and transmission modes (DRX/DTX), (iii) execute mobility functions (e.g., handover, cell re-selection, etc.), and (iv) measure and report channel quality and feedback information in addition to more passive maintenance tasks (e.g., monitor control channels, perform neighbor cell measurements, acquire system information, etc.)

As previously noted, prior art LTE UEs transition from RRC_IDLE 202 mode to RRC_CONNECTED 204 mode based on so-called S-criteria parameters (which includes received signal strength) for nearby cells. The S-criteria parameter is calculated according to EQN. (1):

$$S_{rxlev} = Q_{rxlevmeas} - (Q_{rxlevmin} + Q_{rxlevminoffset}) - P_{compensation} \quad \text{EQN. (1):}$$

where:
$Q_{rxlevmeas}$ is the measured receive level value for the cell (also commonly referred to as the reference signal received power (RSRP));
$Q_{rxlevmin}$ is the minimum required receive level for the cell (defined by the eNB within a System Information Block (SIB) parameter);
$Q_{rxlevminoffset}$ is a hysteresis offset for $Q_{rxlevmin}$ to prevent "ping-ponging" between different eNBs (defined by the eNB within a System Information Block (SIB) parameter); and $$P_{compensation} = \max(P_{emax} - P_{umax}, 0);$$

where:
$P_{emax}$ is the maximum power a UE is allowed to use in the cell (defined by the eNB within a System Information Block (SIB) parameter); and
$P_{umax}$ is the maximum transmit power a UE is allowed to use in the cell (defined by the eNB within a System Information Block (SIB) parameter).

During operation, the calculated $S_{rxlev}$ is used to determine if a cell is suitable for use (where $S_{rxlev} > 0$). As is noted in the foregoing, the only parameter that is not derived from SIB parameters is the $Q_{rxlevmeas}$ (RSRP). Moreover, the parameters that are included within the S-criteria calculation are entirely defined with respect to reception characteristics. None of the parameters are related to the actual capabilities of the eNB, nor the offered services of the eNB.

Within the context of prior art UE operation, consider a case where a signaling procedure fails for reasons unrelated to reception quality. During normal operation, an LTE UE periodically transmits a tracking area update (TAU) to the mobility management entity (MME). The MME responsively initiates a secure session with the Serving GPRS (General Radio Packet Service) Serving Node (SGSN), and performs a location update. The MME signals acknowledgement to the UE if the TAU is successful, or a non-acknowledgement if the TAU is unsuccessful. Unfortunately, in the event that the TAU is aborted mid-procedure, the UE is likely dropped, which will cause the UE to attempt a re-connection.

Since the UE is dropped for reasons unrelated to reception quality, the likelihood of the UE re-establishing the RRC connection on the same cell is very low. For example, if the eNB dropped the UE because the eNB was unable to complete the TAU procedure due to network congestion, it is very unlikely that the congestion event will be fixed before the UE attempts to re-connect. Moreover, since prior art UEs rely on physical reception characteristics to determine the optimal eNB to re-connect to, the UE will attempt to re-connect to the eNB that just dropped it, rather than trying other eNBs which may have lower reception quality but which may also be less congested and more likely to properly service the UE TAU. This underscores one salient deficiency in the prior art; i.e., the UE will in effect keep trying the same base station over and over (to the detriment of the user) due to the monolithic "one criteria" logic implemented in such prior art devices.

While the foregoing discussion is based on an aborted TAU procedure, it is readily appreciated that unexpected session termination for causes unrelated to reception may occur in a wide range of normal operating scenarios. For example, an eNB may not respond to random access channel (RACH) requests after a handover, or where the eNB cannot respond to a random access request within the random access response (RAR) window, etc. In fact, those of ordinary skill will readily recognize that unexpected connection termination may occur any time that the network cannot respond to the UE in a timely manner, where the network opts not to respond to the UE at all, or even where the network responds to the UE in an abberant manner (e.g., incompletely, etc.)

Accordingly, in one exemplary embodiment of the present invention, the UE evaluates the desirability of a cell in terms of both reception characteristics and also one or more metrics that quantify or denote the likelihood of successfully establishing and/or maintaining a RRC connection. Specifically, the exemplary UE in one implementation stores a brief history of unsuccessful connections to eNBs of the network as part of a blacklist. These entries are associated with a timer that counts down from the last time the UE was unexpectedly disconnected from the eNB within recent history. The UE will avoid the eNB until the timer has expired; during this time, the UE will attempt to connect to other eNBs. By avoiding eNBs which have previously been unable to service the UE and instead attempting to connect to other eNBs that may be less congested, the UE can advantageously avoid long out-of-service (OOS) periods.

Figure 3:
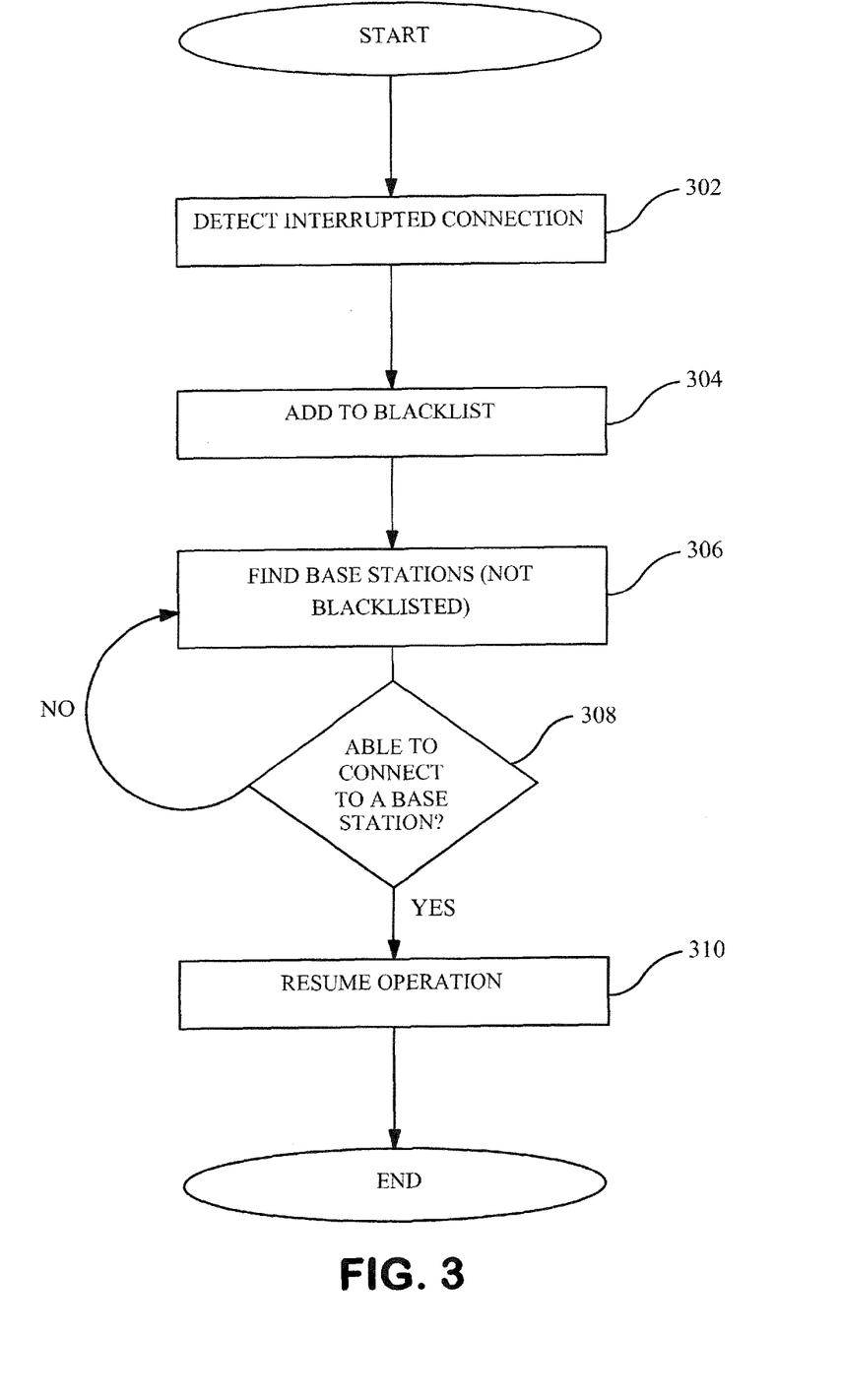
FIG. 3 is a logical flow diagram illustrating one exemplary embodiment of a method for initiating or re-initiating a data connection between a user device (e.g., Long Term Evolution (LTE) user equipment (UE)) and a base station (e.g., an enhanced NodeB (eNB)) in accordance with the present invention.

Referring now to FIG. 3, one exemplary method for UE operation as part of initiating or re-initiating a data connection to between a Long Term Evolution (LTE) user equipment (UE) and an enhanced NodeB (eNB) is illustrated. Initially, the UE has an active connection to a first eNB (step 302). During operation, the active connection is unexpectedly interrupted. For example, during a tracking area update (TAU) procedure, the UE does not receive either an acknowledgement or non-acknowledgement within an acceptable time. Since the UE does not receive the expected signaling (either acknowledgement, or non-acknowledgement), the UE exits the RRC connection.

Responsive to an unexpected connection interruption, the LTE UE adds the eNB identifier to a blacklist (step 304). The eNB identifier is additionally associated with a timer; when the timer expires, the eNB identifier can be removed from the blacklist. In one exemplary embodiment, the timer may have a timer value of three (3) minutes, although the timer value is purely implementation dependent (other implementations may different time values, and/or dynamically assign timer values based on e.g., then prevailing UE and/or network conditions, applications in use (e.g., the UE becoming more or less "desperate" due to power, QoS, or other considerations), etc.

At step 306, the LTE UE searches for any LTE eNBs that are nearby and that have not already been blacklisted. Specifically, the LTE UE: (i) searches for primary synchronization symbols (PSSs) which enable the handset to acquire the slot boundary timing, (ii) searches for secondary synchronization symbols (SSSs) which provides radio frame timing and cell group identity, (iii) decodes the physical downlink shared channel (PDSCH), (iv) decodes the SIB information to identify the cell ID of the eNB, and calculate the S-criteria (or other power measurement), and (v) ranks the eNBs based on S-criteria and blacklist parameters.

While the foregoing example describes only on a simple blacklist, it is appreciated that other more complex variations may consider other factors. For example, once the LTE UE has decoded the PDSCH, the LTE UE can additionally determine the location of the physical broadcast channel which carries more errata. Such an LTE UE can identify eNB characteristics such as: (i) the number of antennas for receive and transmit, (ii) the available bandwidth, (iii) the equipment manufacturer, (iv) the signal to noise ratio (SNR). Any of the foregoing can be further included in the LTE UE's ranking calculations.

Figure 4:
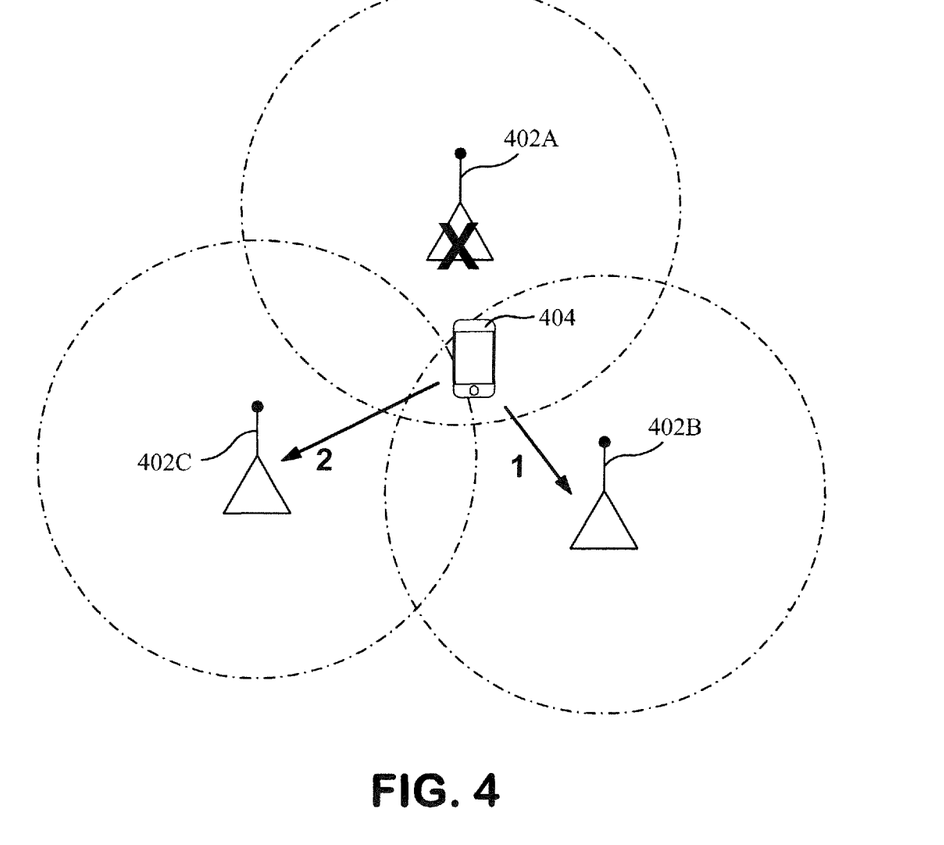
FIG. 4 is a graphical representation of an example use case scenario illustrating the exemplary method described in FIG. 3.

Consider the scenario illustrated in FIG. 4, where an LTE UE 404 is in proximity to and has identified: (i) a first eNB 402A with a highest S-criteria which has been previously blacklisted, (ii) a second eNB 402B with a next highest S-criteria, and (iii) a third eNB 402C with a lowest S-criteria. The LTE UE will rank the second eNB first, and the third eNB next. The first eNB will be disregarded until it is cleared from the blacklist (e.g., when its timer expires in one exemplary implementation), even though it clearly has the best S-criteria of all three.

It will also be appreciated that criteria for admission to addition to the blacklist and/or whitelist may vary as a function of time, network or UE operating condition, sensed parameters, etc. For example, one simple scheme admits a base station to the blacklist if it has experienced any unsolicited disconnect event during the prescribed timer period referenced above, regardless of other history. As another possible scheme, the UE sets a threshold for disconnects by a base station for inclusion on the blacklist; e.g., five or more disconnects within the past 24 hours. However, such criteria can be varied as needed, such as in the case where network congestion is high, and even the "best" possible base stations have experienced some disconnects. Such logic is useful for, inter alis, avoiding all network base stations being put on the blacklist during periods of very high congestion, loading, or instances of equipment failure, etc.—this avoids the case where no base stations are eligible to a given UE.

At step 308 of the method of FIG. 3, the LTE UE attempts to connect to the eNB identified according to the metrics of step 306. The LTE UE may repeat this over multiple candidates until a satisfactory eNB is found. In the aforementioned scenario of FIG. 4, the LTE UE 404 will attempt to connect to the second eNB 402B first. If the second eNB also fails, the second eNB is added to the blacklist with a corresponding timer, and the LTE UE will the attempt the remaining third eNB 404C.

At step 310, once the LTE UE has successfully connected to an eNB, the LTE UE resumes data transfer operation. In this example, the LTE UE completes the tracking area update (TAU) procedure.

Exemplary Mobile Apparatus—

Figure 5:
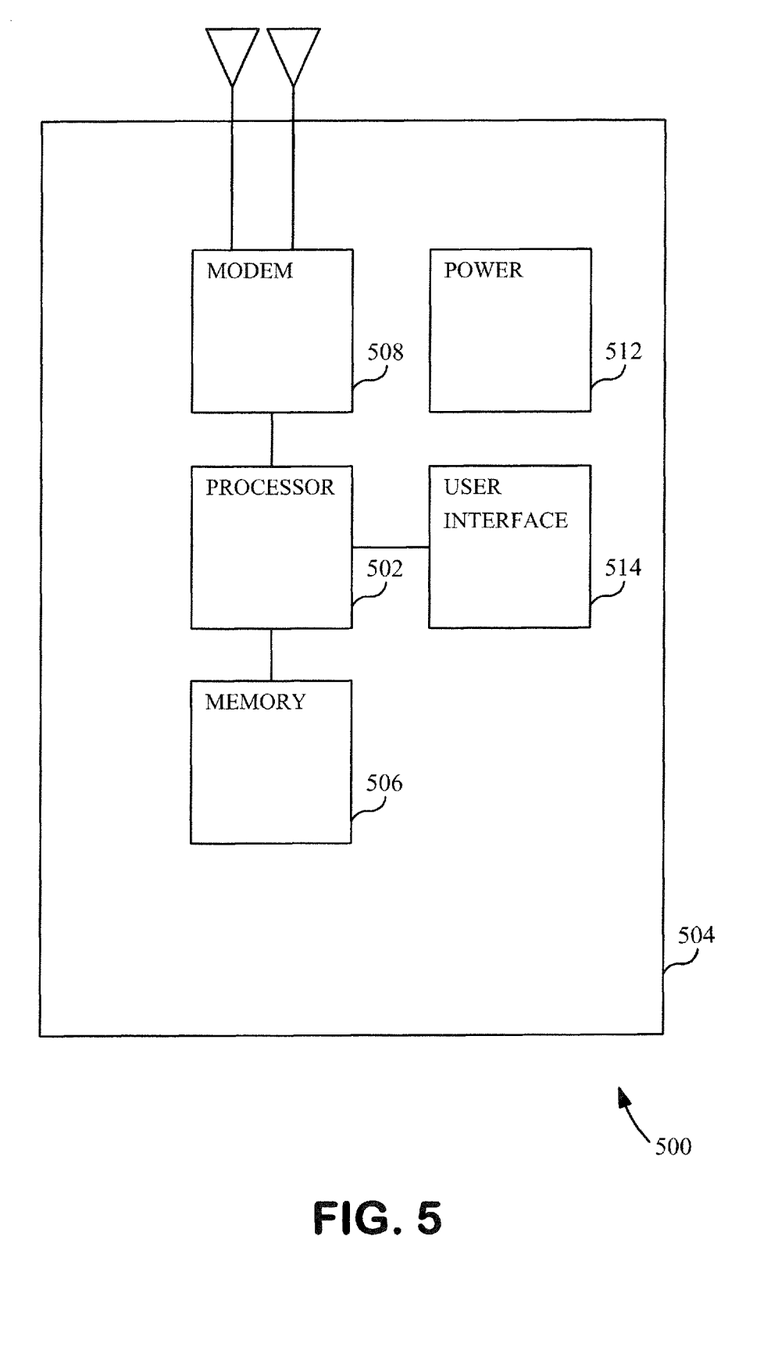
FIG. 5 is a functional block diagram illustrating one embodiment of a mobile device configured to initiate or re-initiate a data connection, in accordance with the present invention.

Exemplary user or client apparatus 500 useful for implementing the methods of the present invention is illustrated.

In the illustrated embodiment, the apparatus 500 includes a processor subsystem 502 such as a digital signal processor, microprocessor, field-programmable gate array, or plurality of processing components mounted on one or more substrates 504. The processing subsystem may also include an internal cache memory. The processing subsystem 502 is connected to a memory subsystem 506 including memory which may for example, include SRAM, flash and SDRAM components. The memory subsystem may implement one or a more of DMA type hardware, so as to facilitate data accesses as is well known in the art. The processor is configured to, inter alia, execute computer-readable instructions that are stored within the memory subsystem.

Furthermore, the illustrated memory subsystem includes an internal database and/or listing configured to store a number of access point identifiers, timer values, field values, etc. In one exemplary embodiment, the memory subsystem includes a so-called "blacklist", where the blacklist identifies base stations which are temporarily and/or permanently restricted from use. In alternate embodiments, the memory subsystem may include a so-called "whitelist", where the whitelist identifies base stations which are temporarily and/or permanently preferred for use. In still other embodiments, the memory subsystem includes a number of entries, each of the entries identifying a base station and one or more fields having criteria useful for determining the identified base station's historical propensity for servicing a data transfer request successfully.

The internal database and/or listing may be additionally configured (via logic or instructions in the host device) to clear itself of an entry upon expiration of a time. For example, in one embodiment, each entry within the table may have a timer that expires over time. At the timer expiration, the entry associated with the timer may be cleared from the database. Alternate schemes may be implemented where entries can be cleared on the basis of an application command, an operating system command, a device driver, a user instruction, based on user preference, etc.

Moreover, the processor subsystem may further include a rules engine (e.g., logic or software process), where the rules engine is configured to, based at least in part on one or more metrics, rank and/or select a base station. In one embodiment, the metrics are derived at least in part on one or more fields having criteria relating to a base station's historical propensity for servicing a data transfer request successfully. In one such example, the rules engine generates a ranking for each base station, based on the values of the one or more fields, where the ranking reflects an order of preference for maximizing the likelihood of connecting to a base station that can successfully service a data request.

The radio/modem subsystem 508 generally includes a digital baseband, analog baseband, TX frontend and RX frontend. The apparatus 500 further includes an antenna assembly 510 that includes a plurality of switches for enabling various antenna operational modes, such as for specific frequency ranges, or specified time slots. In certain embodiments, some components may be obviated or may otherwise be merged with one another as would be appreciated by one of ordinary skill in the art given the present disclosure. In one exemplary embodiment, the radio/modem subsystem is configured to, inter alia, transmit and receive radio frequency (RF) in compliance with Long Term Evolution (LTE) and LTE-Advanced (LTE-A) cellular network standards. Other common examples of cellular network standards include, but are not limited to: Global System for Mobile Communications (GSM), General Packet Radio Service (GPRS), Enhanced Data Rates for GSM Evolution (EDGE), Universal Mobile Telecommunications System (UMTS), High Speed Packet Access (HSPA), Interim Standard 95 (IS-95), Code Division Multiple Access 1Xtreme (CDMA-1X), CDMA-2000, etc.

The illustrated power management subsystem (PMS) 512 provides power to the apparatus, and may include an integrated circuit and or a plurality of discrete electrical components. In one exemplary portable mobile device implementation of the apparatus, the power management subsystem 512 interfaces with a battery.

In certain embodiments of the apparatus 500, a user interface system 514 may be provided. A user interface may include any number of well-known I/O including, without limitation: a keypad, touch screen or "multi-touch" screen, LCD display, backlight, speaker, and microphone. However, it is recognized that in certain applications, one or more of these components may be obviated. For example, PCMCIA card type mobile device embodiments may lack a user interface (as they could piggyback onto the user interface of the device to which they are physically and/or electrically coupled).

The apparatus of FIG. 5 may further include optional additional peripherals including, without limitation, one or more GPS transceivers, or network interfaces such as IrDA ports, Bluetooth transceivers, Wi-Fi (IEEE Std. 802.11) transceivers, WiMAX (IEEE Std. 802.16e) transceivers, USB (e.g., USB 2.0, USB 3.0, Wireless USB, etc.), FireWire, etc. It is however recognized that these components are not necessary for operation of the apparatus 500 in accordance with the principles of the present invention.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A client device suitable for connecting to an access point of a network, the client device comprising:
   a wireless interface;
   a processor; and
   a storage device configured to store computer-executable instructions that, when executed by the processor, cause the client device to:
      access a list of access points, the list of access points comprising:
         one or more parameters, wherein each parameter is based in part on an access point characteristic, and at least one of the one or more parameters is based in part on a received signal strength, and
         a blacklist identifying one or more access points that have unexpectedly disconnected the client device,
      identify a first access point, wherein the identification of the first access point is based in part on (i) the first access point not being on the blacklist, and (ii) the first access point having a desirable received signal strength, and
      establish a connection to the first access point.

2. The client device of claim 1, wherein the client device comprises a Long Term Evolution (LTE) user equipment (UE) and the list of access points comprises one or more of enhanced NodeB's (eNBs).

3. The client device of claim 1, wherein the blacklist identifies one or more access points that are unavailable for connection.

4. The client device of claim 1, wherein the list of access points further comprises a whitelist of access points that are preferred for connection.

5. The client device of claim 1, wherein at least one of the one or more parameters comprises historical data based on previous connections between an access point and the client device.

6. The client device of claim 1, wherein at least one of the one or more parameters is updated upon an expiration of a timer.

7. The client device of claim 1, wherein at least one of the one or more parameters is based in part on an access point's capability.

8. A method for connecting a client device to an access point of a network, the method comprising:
   at the client device:
      accessing a blacklist of access points, the blacklist of access points identifying one or more access points as being unsuitable for connection;
      searching for available access points;
      determining a first access point, from the searched available access points, based in part on (i) the first access point not being on the blacklist, and (ii) a received signal strength of the first access point; and
      establishing a connection between the client device and the first access point.

9. The method of claim 8, wherein the client device comprises a Long Term Evolution (LTE) user equipment (UE), and the first access point comprises an enhanced NodeB (eNB).

10. The method of claim 8, wherein at least one entry in the blacklist of access points is associated with a timer.

11. The method of claim 10, wherein responsive to expiration of the timer, the at least one entry is removed from the blacklist of access points.

12. The method of claim 10, wherein responsive to expiration of the timer, the at least one entry is updated.

13. The method of claim 8, wherein determining the first access point is further based in part on a capability of the first access point.

14. A method for connecting a client device to an access point of a network, the method comprising:
   at the client device:

identifying a plurality of available access points;

ranking the plurality of available access points according to a first criteria, the first criteria based in part on received signal strength;

accessing a blacklist of access points, the blacklist of access points identifying one or more access points that have unexpectedly disconnected the client device;

determining a first access point from the plurality of available access points, based in part on (i) the first access point not being identified on the blacklist and (ii) a rank associated with the first access point;

requesting connection to the first access point; and responsive to a granted request, establishing connection to the first access point.

15. The method of claim 14, wherein the client device comprises a Long Term Evolution (LTE) user equipment (UE), and the first access point comprises an enhanced NodeB (eNB).

16. The method of claim 15, wherein requesting connection to the first access point comprises sending a radio resource control (RRC) connection request to the first access point.

17. The method of claim 15, wherein the client device establishes connection to the first access point by participating in a handover procedure between a second access point and the first access point.

18. The method of claim 15, wherein the client device establishes connection to the first access point by participating in a cell selection procedure or a cell re-selection procedure.

19. A client device suitable for connecting to an access point of a network, the client device comprising:

a wireless interface;

a processor; and a storage device configured to store computer-executable instructions that, when executed by the processor, causes the client device to:

at least periodically obtain a list of access points from a network entity of the network, the list of access points comprising one or more parameters, and wherein at least one of the one or more parameters is based in part on a signal quality indicator, responsive to a loss of connection with a first access point, add the first access point to a blacklist, identify a second access point, from the most recently obtained list of access points, based in part on (i) the second access point not being on the blacklist and (ii) a signal quality indicator of the second access point, and establish a connection to the second access point.

* * * * *